United States Patent
Takahashi (10) Patent No.: US 9,847,682 B2
(45) Date of Patent: Dec. 19, 2017

(54) ROTOR AND ROTATING ELECTRIC MACHINE INCLUDING THE ROTOR

(71) Applicant: DENSO CORPORATION, Kariya, Aichi-pref. (JP)

(72) Inventor: Yuki Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 385 days.

(21) Appl. No.: 14/542,949

(22) Filed: Nov. 17, 2014

(65) Prior Publication Data
US 2015/0137632 A1    May 21, 2015

(30) Foreign Application Priority Data
Nov. 15, 2013 (JP) ................. 2013-236493

(51) Int. Cl.
*H02K 1/27* (2006.01)
*H02K 1/28* (2006.01)
(Continued)

(52) U.S. Cl.
CPC ............. *H02K 1/28* (2013.01); *H02K 1/2766* (2013.01); *H02K 1/32* (2013.01); *H02K 9/19* (2013.01); *H02K 2213/03* (2013.01)

(58) Field of Classification Search
CPC .. H02K 1/27; H02K 1/28; H02K 1/32; H02K 9/19; H02K 9/1976; H02K 9/197
(Continued)

(56) References Cited

U.S. PATENT DOCUMENTS 2,680,822 A * 6/1954 Brainard ............... H02K 1/276
29/598
5,610,456 A * 3/1997 Wille .................. H01R 39/381
310/227
(Continued)

FOREIGN PATENT DOCUMENTS

JP       2-60445    2/1990
JP    2000-125527   4/2000
(Continued)

OTHER PUBLICATIONS

Ogawa et al, JP 2006-67777_EN, English translation, Mar. 2006.*
(Continued)

*Primary Examiner* — John K Kim
(74) *Attorney, Agent, or Firm* — Nixon & Vanderhye P.C.

(57) ABSTRACT

A rotor includes a hollow cylindrical rotor core that has a center hole, in which a rotating shaft is to be press-fitted, and a plurality of magnet-receiving holes in which a plurality of permanent magnets are respectively received. In a radially inner surface of the rotor core defining the center hole, there are formed a plurality of non-contacting recesses and a plurality of contacting protrusions alternately in the circumferential direction of the rotor core. Each of the non-contacting recesses is recessed radially outward so as not to be in contact with the rotating shaft. Each of the contacting protrusions protrudes radially inward so as to be in pressed contact with the rotating shaft. The rotor core further has a plurality of through-holes each of which penetrates the rotor core in the axial direction of the rotor core and is located radially outside a corresponding one of the contacting protrusions.

13 Claims, 7 Drawing Sheets

(51) Int. Cl.
*H02K 1/32* (2006.01)
*H02K 9/19* (2006.01)
*H02K 9/197* (2006.01)

(58) Field of Classification Search
USPC .......... 310/52, 54, 59, 61, 216.106, 216.121
See application file for complete search history.

(56) References Cited

U.S. PATENT DOCUMENTS

| | | | |
|---|---|---|---|
| 2012/0086291 A1* | 4/2012 | DeBlock | H02K 1/20 |
| | | | 310/61 |
| 2013/0020898 A1* | 1/2013 | Ryu | H02K 1/276 |
| | | | 310/156.56 |
| 2014/0265699 A1 | 9/2014 | Morikawa et al. | |
| 2015/0137632 A1* | 5/2015 | Takahashi | H02K 1/28 |
| | | | 310/54 |

FOREIGN PATENT DOCUMENTS

| | | | |
|---|---|---|---|
| JP | 2005-168151 | | 6/2005 |
| JP | 2006067777 A | * | 3/2006 |
| JP | 2006-254662 | | 9/2006 |
| JP | 2009-303446 | | 12/2009 |
| JP | 2010-124559 | | 6/2010 |
| JP | 2011-259689 | | 12/2011 |
| JP | 2013-115848 | | 6/2013 |

OTHER PUBLICATIONS

Office Action (3 pgs.) dated Sep. 29, 2015 issued in corresponding Japanese Application No. 2013-236493 with an at least partial English-language translation (3 pgs.).

* cited by examiner

ROTOR AND ROTATING ELECTRIC MACHINE INCLUDING THE ROTOR

CROSS-REFERENCE TO RELATED APPLICATION

This application is based on and claims priority from Japanese Patent Application No. 2013-236493 filed on Nov. 15, 2013, the content of which is hereby incorporated by reference in its entirety into this application.

BACKGROUND

1. Technical Field

The present invention relates to rotors and rotating electric machines that include those rotors and are used in, for example, motor vehicles as electric motors and electric generators.

2. Description of Related Art

There have been known rotating electric machines that are used in, for example, motor vehicles as electric motors and electric generators. Those rotating electric machines generally include a rotating shaft, a rotor fixed on the rotating shaft so as to be rotatable together with the rotating shaft, and a stator disposed in radial opposition to the rotor.

Moreover, there also have been known, for example from Japanese Patent Application Publication No. JP2011-259689A, methods of fastening a rotor core of the rotor to the rotating shaft. Those fastening methods include: (a) a method of fitting keys (or protrusions) formed in one of the rotor core and the rotating shaft into keyways (or recesses) formed in the other of the rotor core and the rotating shaft; (b) a method of performing a knurling process on contact surfaces of the rotor core and the rotating shaft; and (c) a method of press-fitting the rotor core onto the rotating shaft.

However, in the case of using the fastening method (a), there exist circumferential backlashes between the keys and the wall surfaces of the keyways. Consequently, when the rotor and the rotating shaft together rotate at a high speed, the rotor may vibrate due to the backlashes, resulting in torque variation. Moreover, due to the backlashes, the characteristics of the rotating electric machine and an inverter connected to the machine may be deviated from their respective initial set values.

In the case of using the fastening method (b), when the rotor and the rotating shaft together rotate at a high speed, backlashes may be created between the contact surfaces of the rotor core and the rotating shaft due to the difference between the centrifugal force acting on the rotor and the centrifugal force acting on the rotating shaft. Consequently, the rotor may vibrate due to the created backlashes, resulting in torque variation. In addition, in this case, the created backlashes will disappear when the rotor and the rotating shaft come to rotate at a low speed or be stopped.

In the case of using the fastening method (c), the interference between the rotor core and the rotating shaft is generally set so as to be equal to zero when the rotor and the rotating shaft together rotate at a maximum speed. Accordingly, during the process of press-fitting the rotor core onto the rotating shaft, the interference between the rotor core and the rotating shaft will be largest, causing high press-fit stress to be induced in the rotor core. Consequently, the rotor core may be deformed due to the high press-fit stress, thereby changing a predetermined air gap between the rotor core and the stator of the rotating electric machine which is disposed in radial opposition to the rotor core.

SUMMARY

According to exemplary embodiments, there is provided a rotor for a rotating electric machine. The rotor includes a hollow cylindrical rotor core and a plurality of permanent magnets. The rotor core has a center hole, in which a rotating shaft of the rotating electric machine is to be press-fitted, and a plurality of magnet-receiving holes arranged in a circumferential direction of the rotor core. Each of the permanent magnets is received in a corresponding one of the magnet-receiving holes of the rotor core. In a radially inner surface of the rotor core which defines the center hole, there are formed a plurality of non-contacting recesses and a plurality of contacting protrusions. Each of the non-contacting recesses extends in an axial direction of the rotor core and is recessed radially outward so as not to be in contact with the rotating shaft. Each of the contacting protrusions extends in the axial direction of the rotor core and protrudes radially inward so as to be in pressed contact with the rotating shaft. The non-contacting recesses are alternately arranged with the contacting protrusions in the circumferential direction of the rotor core. The rotor core further has a plurality of through-holes each of which penetrates the rotor core in the axial direction and is located radially outside a corresponding one of the contacting protrusions.

With the above configuration, during the process of press-fitting the rotating shaft into the center hole of the rotor core, the press-fit stress induced in the rotor core is distributed only among the contacting protrusions. That is, no press-fit stress is distributed to the non-contacting recesses. Further, for each of the contacting protrusions, the displacement of the contacting protrusion caused by the press-fit stress can be absorbed by the corresponding through-hole located radially outside the contacting protrusion. As a result, it is possible to prevent deformation of the rotor core on the radially outer periphery thereof, thereby keeping a predetermined air gap between the rotor and a stator of the rotating electric machine unchanged.

Preferably, each of the through-holes is located so that both the through-hole and the corresponding contacting protrusion are circumferentially bisected by a same imaginary line that extends in a radial direction of the rotor core.

It is preferable that the through-holes have a greater circumferential width than the contacting protrusions.

Each of the through-holes may be configured as a magnetic flux barrier that is formed radially inside a corresponding one of the permanent magnets to block leakage of magnetic flux radially inward.

According to the exemplary embodiments, there is also provided a rotating electric machine which includes: the rotor and the rotating shaft as described above; a stator disposed in radial opposition to the rotor; a cooling oil passage formed in the rotating shaft; and a cooling oil supplier configured to supply cooling oil to the non-contacting recesses formed in the rotor core via the cooling oil passage.

The rotor may further include a pair of end plates that are respectively arranged on opposite axial sides of the rotor core so as to sandwich the rotor core therebetween. In this case, it is preferable that in each of the end plates, there is formed a first connecting passage that fluidically connects the non-contacting recesses to the through-holes formed in the rotor core. It is further preferable that in each of the end plates, there is also formed a second connecting passage that fluidically connects the through-holes to the magnet-receiving holes of the rotor core. It is also preferable that in each of the end plates, there are formed a plurality of cooling oil discharge holes; each of the cooling oil discharge holes fluidically communicates with a corresponding one of the non-contacting recesses formed in the rotor core, thereby allowing the cooling oil supplied to the corresponding non-contacting recess to be discharged axially outward via the cooling oil discharge hole.

The rotating electric machine may further include: a housing that receives both the rotor and the stator therein so that the stator abuts a wall of the housing; a cooling water passage formed in the wall of the housing; and a cooling water supplier configured to supply cooling water to the cooling water passage and thereby cool the stator. The rotor may further include a pair of end plates that are respectively arranged on opposite axial sides of the rotor core to block leakage of the cooling oil from the non-contacting recesses axially outward.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Exemplary embodiments will be described hereinafter with reference to FIGS. 1-11. It should be noted that for the sake of clarity and understanding, identical components having identical functions throughout the whole description have been marked, where possible, with the same reference numerals in each of the figures and that for the sake of avoiding redundancy, descriptions of the identical components will not be repeated.

First Embodiment

Figure 1:
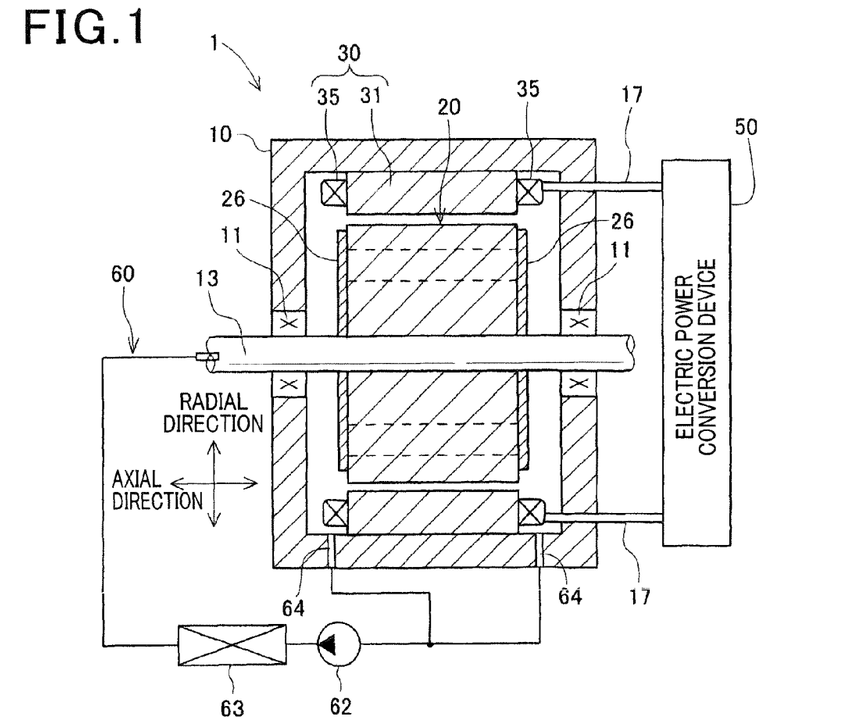
FIG. 1 is a schematic cross-sectional view of a rotating electric machine according to a first embodiment.

FIG. 1 shows the overall configuration of a rotating electric machine 1 according to the first embodiment.

In the present embodiment, the rotating electric machine 1 is configured as an inner rotor-type motor-generator for use in, for example, a motor vehicle. The motor-generator can selectively function either as an electric motor or as an electric generator.

As shown in FIG. 1, the rotating electric machine 1 includes a housing 10, a rotating shaft 13, a rotor 20, a stator 30, and a cooling oil supplier 60. Moreover, the rotating electric machine 1 is electrically connected with an electric power conversion device 50 via input/output lines 17. The housing 10 of the rotating electric machine 1 and a case member (not shown in the figures) of the electric power conversion device 50 may be either integrally formed into one piece or separately formed and then fixed together by fixing means. The fixing means may be implemented by, for example, a bolt/nut combination, a male thread/female thread combination, a through-hole/cotter pin combination, or a joint formed by welding or crimping. It is also possible to fix the housing 10 of the rotating electric machine 1 and the case member of the electric power conversion device 50 by suitably combining at least two of the aforementioned fixing means.

The housing 10 has a substantially hollow cylindrical shape with both ends closed. The rotating shaft 13 has its end portions respectively rotatably supported by axial end walls of the housing 10 via bearings 11. The rotating shaft 13 has a hollow cylindrical shape. In the internal space of the rotating shaft 13, there is formed a cooling oil passage 61 through which cooling oil supplied by the cooling oil supplier 60 flows. On the outer periphery of a central portion of the rotating shaft 13 which is received in the housing 10, there is fixedly fitted the rotor 20 so as to be rotatable together with the rotating shaft 13.

Figure 2:
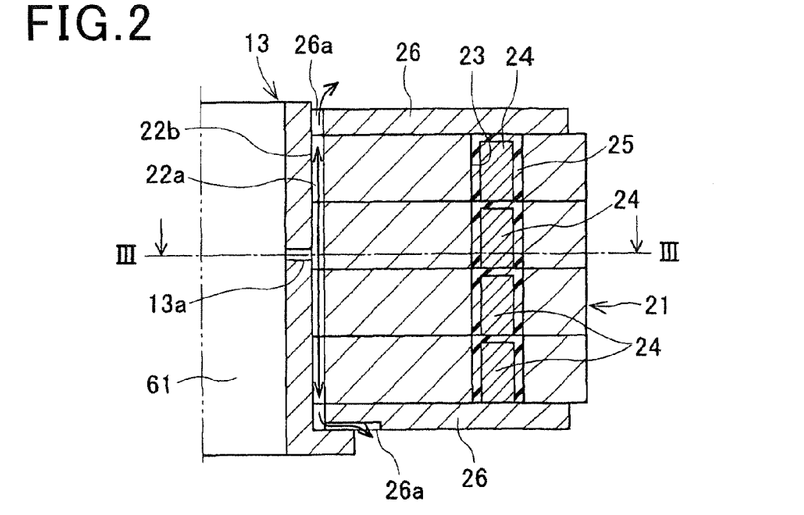
FIG. 2 is a schematic cross-sectional view of a rotor according to the first embodiment, the cross-sectional view being taken along the line II-II in FIG. 3 and parallel to an axial direction of the rotor.
Figure 3:
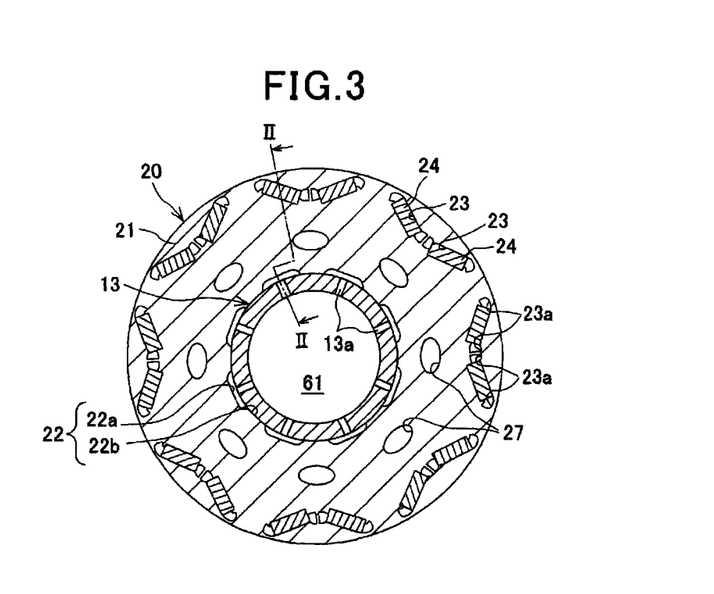
FIG. 3 is a schematic cross-sectional view of the rotor according to the first embodiment, the cross-sectional view being taken along the line III-III in FIG. 2 and perpendicular to the axial direction of the rotor.

Referring to FIGS. 1-3, the rotor 20 includes a hollow cylindrical rotor core 21, a plurality of permanent magnets 24, a resin filler 25 and a pair of end plates 26. The rotor core 21 has a center hole 22, in which the rotating shaft 13 is press-fitted, and a plurality of pairs of magnet-receiving holes 23 that are formed in the vicinity of a radially outer periphery of the rotor core 21 so as to be spaced from one another in the circumferential direction of the rotor core 21 (or the circumferential direction of the rotor 20) at predetermined intervals. The permanent magnets 24 are respectively received in the magnet-receiving holes 23 of the rotor core 21 so as to form a plurality of magnetic poles on the radially outer periphery of the rotor core 21. The polarities of the magnetic poles alternate between north and south in the circumferential direction of the rotor core 21. The resin filler 25 is filled in the magnet-receiving holes 23 of the rotor core 21 to fix the permanent magnets 24 in the magnet-receiving holes 23. The end plates 26 are respectively arranged on opposite axial sides of the rotor core 21 so as to sandwich the rotor core 21 therebetween.

More specifically, in the present embodiment, the rotor core 21 is formed by stacking a plurality (e.g., four) of rotor core segments in the axial direction. Moreover, each of the rotor core segments is formed by laminating a plurality of magnetic steel sheets in the axial direction; each of the magnetic steel sheets is annular-shaped to have a center hole in which the rotating shaft 13 is to be press-fitted.

Figure 4:
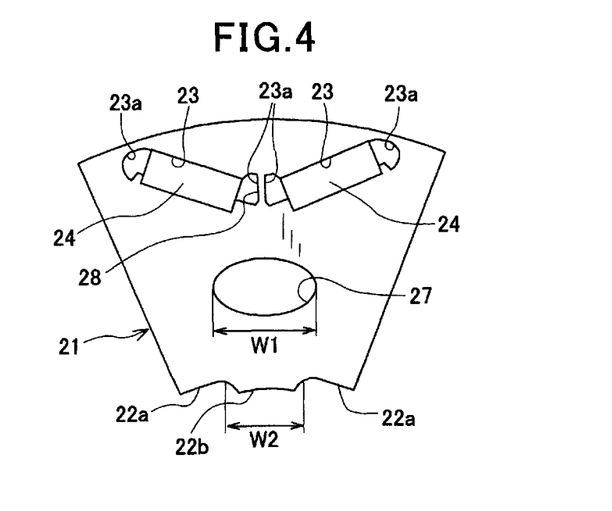
FIG. 4 is an axial view of a portion of the rotor according to the first embodiment, the portion corresponding to one of magnetic poles that are formed in the rotor.

Furthermore, in the present embodiment, as shown in FIGS. 3-4, in a radially inner surface of the rotor core 21 which defines the center hole 22, there are formed a plurality of non-contacting recesses (or valleys) 22a and a plurality of contacting protrusions (or ridges) 22b. Each of the non-contacting recesses 22a extends in the axial direction of the rotor core 21 and is recessed radially outward so as not to be in contact with the rotating shaft 13. Each of the contacting protrusions 22b extends in the axial direction of the rotor core 21 and protrudes radially inward so as to be in pressed contact with the rotating shaft 13. The non-contacting recesses 22a are alternately arranged with the contacting protrusions 22b in the circumferential direction of the rotor core 21.

Moreover, in the present embodiment, each of the contacting protrusions 22b is circumferentially positioned so as to be in radial alignment with the center of a corresponding one of the magnetic poles formed by the permanent magnets 24 received in the pairs of the magnet-receiving holes 23 of the rotor core 21. The non-contacting recesses 22a have a circumferential width set to be about 1.5 times a circumferential width W2 of the contacting protrusions 22b. Further, as shown in FIGS. 2-3, each of the non-contacting recesses 22a fluidically communicates with the cooling oil passage 61 formed in the rotating shaft 13 via a corresponding one of cooling oil introduction holes 13a that are formed in a radial pattern at an axially-central spot in the rotating shaft 13.

Furthermore, in the present embodiment, the rotor core 21 further has a plurality of through-holes 27 that are formed so as to penetrate the rotor core 21 in the axial direction and have an elliptical cross section perpendicular to the axial direction. Further, each of the through-holes 27 is formed radially outside a corresponding one of the contacting protrusions 22b so as to be in radial alignment with the corresponding contacting protrusion 22b. That is, in the present embodiment, each of the through-holes 27 is radially interposed between the corresponding contacting protrusion 22b and the center of the corresponding magnetic pole. Moreover, each of the through-holes 27 is formed so that the major axis of the elliptical cross section of the through-hole 27 is perpendicular to the radial direction of the rotor core 21. The through-holes 27 have a circumferential width W1 set to be greater than the circumferential width W2 of the contacting protrusions 22b.

In addition, it is preferable that for each of the through-holes 27, both the circumferential center of the through-hole 27 and the circumferential center of the corresponding contacting protrusion 22b fall on an imaginary line that extends in a radial direction of the rotor core 21. In other words, it is preferable that for each of the through-holes 27, both the through-hole 27 and the corresponding contacting protrusion 22b are circumferentially bisected by the same imaginary line. In this case, it is possible to more effectively relax the press-fit stress induced in the rotor core 21 during the process of press-fitting the rotating shaft 13 into the center hole 22 of the rotor core 21.

Each of the magnet-receiving holes 23 is formed so as to penetrate the rotor core 21 in the axial direction and have a substantially rectangular cross section perpendicular to the axial direction. Further, each pair of the magnet-receiving holes 23 is arranged in a substantially V-shape that opens toward the radially outer periphery of the rotor core 21 (i.e., toward the stator 30 side). In addition, in the present embodiment, there are formed a total of eight pairs of the magnet-receiving holes 23 (or a total of sixteen magnet-receiving holes 23) in the rotor core 21.

Each of the permanent magnets 24 is embedded in a corresponding one of the magnet-receiving holes 23 of the rotor core 21. Each of the permanent magnets 24 has a substantially rectangular cross section perpendicular to the axial direction of the rotor core 21. Moreover, for each pair of the magnet-receiving holes 23 of the rotor core 21, the two permanent magnets 24 which are respectively inserted in the two magnet-receiving holes 23 of the pair are arranged so that the polarities (north or south) of the two permanent magnets 24 are the same on the radially outer periphery of the rotor core 21. Consequently, the two permanent magnets 24 together form one magnetic pole on the radially outer periphery of the rotor core 21. Accordingly, in the present embodiment, there are formed a total of eight magnetic poles (i.e., four north poles and four south poles) on the radially outer periphery of the rotor core 21. Further, as described previously, the polarities of the eight magnetic poles alternate between north and south in the circumferential direction of the rotor core 21. In addition, each of the permanent magnets 24 is fixed in the corresponding magnet-receiving hole 23 of the rotor core 21 by the resin filler 25 filled in the corresponding magnet-receiving hole 23. The resin filler 25 is made of a nonmagnetic resin.

Moreover, in the present embodiment, as shown in FIG. 4, for each of the magnet-receiving holes 23 of the rotor core 21, there are formed a pair of magnetic flux barriers (or magnetic voids) 23a respectively on opposite circumferential sides of the magnet-receiving hole 23. Further, for each pair of the magnet-receiving holes 23, there is formed a center bridge 28 that radially extends between the two magnet-receiving holes 23 of the pair. The center bridge 28 is provided for causing magnetic flux saturation and thereby impeding formation of a magnetic circuit between the two magnet-receiving holes 23.

Referring back to FIGS. 1-2, the end plates 26 are formed, for example, of a ferrous metal into an annular shape. The end plates 26 have an inner diameter set to be equal to the inner diameter of the rotor core 21 and an outer diameter set to be less than the outer diameter of the rotor core 21. The end plates 26 are press-fitted, together with the rotor core 21, onto the radially outer surface of the rotating shaft 13 so as to have the rotor core 21 axially interposed therebetween. Each of the end plates 26 has a plurality of cooling oil discharge holes 26a formed in a radially inner end portion thereof; each of the cooling oil discharge holes 26a fluidically communicates with a corresponding one of the non-contacting recesses 22a formed in the rotor core 21.

The stator 30 includes an annular stator core 31 and a three-phase stator coil 35. The stator core 31 has a plurality of slots (not shown in the figures) formed therein; the slots are spaced from one another in the circumferential direction of the stator core 31. The stator coil 35 is mounted on the stator core 31 so as to be received in the slots of the stator core 31. The stator coil 35 is electrically connected to the electric power conversion device 50 via the input/output lines 17. Moreover, the radially outer surface of the stator core 31 is fixedly fitted to the inner surface of an axially-central portion of a circumferential wall of the housing 10. Consequently, the stator 30 is fixed, in the housing 10, radially outside the rotor 20 so as to face the rotor 20 with a predetermined air gap formed therebetween.

The cooling oil supplier 60 is configured to supply cooling oil, such as ATF (Automatic Transmission Fluid), to the non-contacting recesses 22a formed in the rotor core 21. As shown in FIG. 1, the cooling oil supplier 60 includes a cooling oil pump 62 and a heat dissipater (or radiator) 63. The cooling oil pump 62 delivers the cooling oil (not shown in the figures) to the cooling oil passage 61 formed in the rotating shaft 13. The heat dissipater 63 dissipates the heat of the cooling oil which has returned to the cooling oil pump 62 after flowing through the cooling oil passage 61 formed in the rotating shaft 13 and the non-contacting recesses 22a formed in the rotor core 21. The cooling oil passage 61, the cooling oil pump 62 and the heat dissipater 63 are fluidically connected with one another via cooling oil pipes, thereby forming a cooling oil circulation circuit.

More specifically, the cooling oil discharged from the cooling oil pump 62 is delivered, via the heat dissipater 63, to the cooling oil passage 61 formed in the rotating shaft 13. Then, the cooling oil is introduced from the cooling oil passage 61 to axially-central portions of the non-contacting recesses 22a formed in the rotor core 21 via the corresponding cooling oil introduction holes 13a formed in the rotating shaft 13. The introduced cooling oil then flows through the non-contacting recesses 22a from the axially-central portions to the axial ends of the non-contacting recesses 22a while cooling the rotor core 21. Thereafter, the cooling oil is discharged from the non-contacting recesses 22a to the internal space of the housing 10 via the corresponding cooling oil discharge holes 26a formed in the end plates 26. The discharged cooling oil is then drained out of the housing 10 via a drain outlet 64 formed in a bottom part of the circumferential wall of the housing 10, and returned to the cooling oil pump 62. Thereafter, the cooling oil is again discharged from the cooling oil pump 62 to circulate through the cooling oil circulation circuit.

The above-described rotating electric machine 1 according to the present embodiment operates as follows.

Referring to FIG. 1, in the present embodiment, the rotating electric machine 1 selectively operates in either a motor mode or a generator mode.

In the motor mode, a drive current, which results from electric power conversion by the electric power conversion device 50, is supplied from the electric power conversion device 50 to the stator coil 35, thereby energizing the stator 30. Upon energization of the stator 30, rotating torque is generated, causing the rotor 20 to rotate together with the rotating shaft 13. The generated torque is then outputted, via the rotor 20 and the rotating shaft 13, to rotating objects such as vehicle wheels and a propeller.

In addition, between the rotating shaft 13 and the rotating objects, there may be interposed a power transmission mechanism which includes at least one of, for example, a shaft, a cam, a rack and pinion and a gear pair.

In the generator mode, no drive current is supplied from the electric power conversion device 50 to the stator coil 35. Instead, rotating torque is transmitted from the rotating objects to the rotating shaft 13, causing the rotor 20 to rotate together with the rotating shaft 13. With rotation of the rotor 20, counterelectromotive force (or regenerative electric power) is generated in the stator coil 35. The generated counterelectromotive force is then outputted, via the electric power conversion device 50, to charge a battery.

During operation of the rotating electric machine 1 in either the motor mode or the generator mode, the permanent magnets 24 generate heat with rotation of the rotor 20, causing the temperature of the rotor core 21 to increase. On the other hand, the cooling oil suppler 60 starts its operation at the same time as the start of operation of the rotating electric machine 1. Consequently, the cooling oil is circulated through the cooling oil circulation circuit as described above. As a result, with the circulation of the cooling oil, both the rotating shaft 13 and the rotor core 21 can be effectively cooled.

According to the present embodiment, it is possible to achieve the following advantageous effects.

In the present embodiment, the rotor 20 includes the hollow cylindrical rotor core 21 and the permanent magnets 24. The rotor core 21 has the center hole 22, in which the rotating shaft 13 is press-fitted, and the pairs of the magnet-receiving holes 23 arranged in the circumferential direction of the rotor core 21 at the predetermined intervals. Each of the permanent magnets 24 is received in the corresponding one of the magnet-receiving holes 23 of the rotor core 21. In the radially inner surface of the rotor core 21 which defines the center hole 22, there are formed the non-contacting recesses 22a and the contacting protrusions 22b. Each of the non-contacting recesses 22a extends in the axial direction of the rotor core 21 and is recessed radially outward so as not to be in contact with the rotating shaft 13. Each of the contacting protrusions 22b extends in the axial direction of the rotor core 21 and protrudes radially inward so as to be in pressed contact with the rotating shaft 13. The non-contacting recesses 22a are alternately arranged with the contacting protrusions 22b in the circumferential direction of the rotor core 21. The rotor core 21 further has the through-holes 27 that are formed so as to penetrate the rotor core 21 in the axial direction. Each of the through-holes 27 is located radially outside the corresponding one of the contacting protrusions 22b.

With the above configuration, during the process of press-fitting the rotating shaft 13 into the center hole 22 of the rotor core 21, the press-fit stress induced in the rotor core 21 is distributed only among the contacting protrusions 22b. That is, no press-fit stress is distributed to the non-contacting recesses 22a. Further, for each of the contacting protrusions 22b, the displacement of the contacting protrusion 22b caused by the press-fit stress can be absorbed by the corresponding through-hole 27 located radially outside the contacting protrusion 22b. As a result, it is possible to prevent deformation of the rotor core 21 on the radially outer periphery thereof, thereby keeping the predetermined air gap between the rotor 20 and the stator 30 unchanged.

Further, in the present embodiment, each of the through-holes 27 is located so that both the through-hole 27 and the corresponding contacting protrusion 22b are circumferentially bisected by the same imaginary line that extends in the radial direction of the rotor core 21. Consequently, it is possible to more effectively relax the press-fit stress induced in the rotor core 21 during the process of press-fitting the rotating shaft 13 into the center hole 22 of the rotor core 21.

Moreover, in the present embodiment, the circumferential width W1 of the through-holes 27 is set to be greater than the circumferential width W2 of the contacting protrusions 22b. Consequently, it is possible for each of the through-holes 27 to more reliably absorb the displacement of the corresponding contacting protrusion 22b caused by the press-fit stress distributed to the corresponding contacting protrusion 22b. As a result, it is possible to more reliably prevent deformation of the rotor core 21 on the radially outer periphery thereof, thereby more reliably keeping the predetermined air gap between the rotor 20 and the stator 30 unchanged.

In the present embodiment, the rotating electric machine 1 includes the cooling oil supplier 60 configured to supply the cooling oil to the non-contacting recesses 22a formed in the rotor core 21 via the cooling oil passage 61 formed in the rotating shaft 13. Consequently, it is possible to effectively cool both the rotor core 21 and the rotating shaft 13 with the cooling oil.

Modification

In the previous embodiment, each of the contacting protrusions 22b is circumferentially positioned so as to be in radial alignment with the center of the corresponding one of the magnetic poles formed by the permanent magnets 24 received in the pairs of the magnet-receiving holes 23 of the rotor core 21. The through-holes 27 have the elliptical cross section perpendicular to the axial direction of the rotor core 21. The circumferential width of the non-contacting recesses 22a is about 1.5 times the circumferential width W2 of the contacting protrusions 22b (see FIGS. 3-4).

Figure 5:
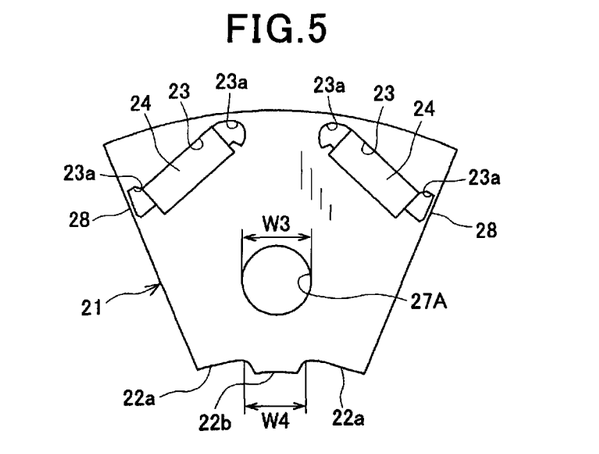
FIG. 5 is an axial view of a portion of a rotor according to one modification of the first embodiment, the portion corresponding to one of magnetic poles that are formed in the rotor.

In comparison, in this modification, as shown in FIG. 5, each of the contacting protrusions 22b is circumferentially interposed between adjacent two of the magnetic poles formed by the permanent magnets 24. Moreover, through-holes 27A, each of which is formed radially outside a corresponding one of the contacting protrusions 22b, have a circular cross section perpendicular to the axial direction of the rotor core 21. The circumferential width W3 of the through-holes 27A is set to be greater than the circumferential width W4 of the contacting protrusions 22b. In addition, the circumferential width W3 of the through-holes 27A is less than the circumferential width W1 of the through-holes 27 in the previous embodiment. Accordingly, in this modification, the circumferential width of the non-contacting recesses 22a is increased to be about 2 times the circumferential width W4 of the contacting protrusions 22b.

Second Embodiment

Figure 6:
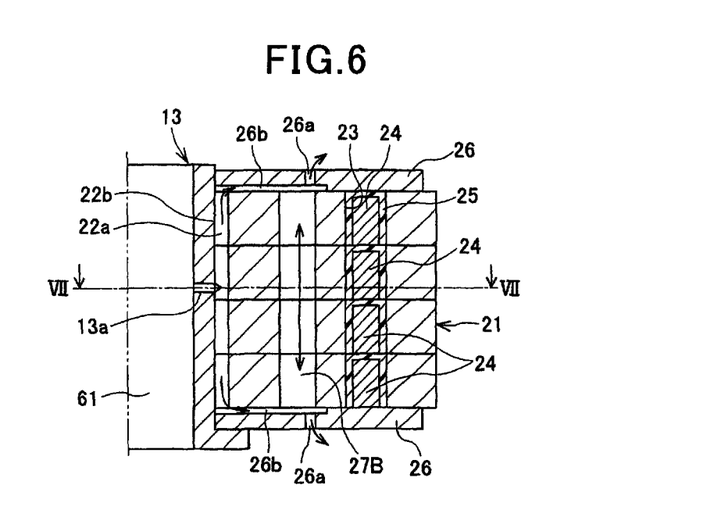
FIG. 6 is a schematic cross-sectional view of a rotor according to a second embodiment, the cross-sectional view being taken along the line VI-VI in FIG. 7 and parallel to an axial direction of the rotor.
Figure 7:
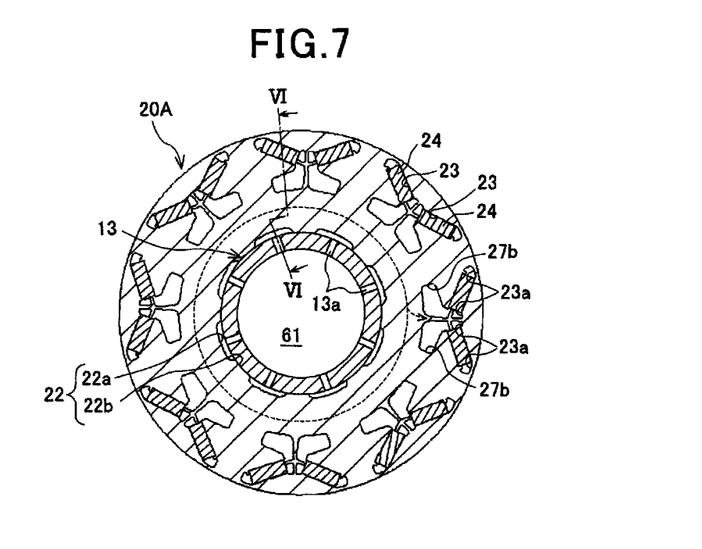
FIG. 7 is a schematic cross-sectional view of the rotor according to the second embodiment, the cross-sectional view being taken along the line VII-VII in FIG. 6 and perpendicular to the axial direction of the rotor.
Figure 8:
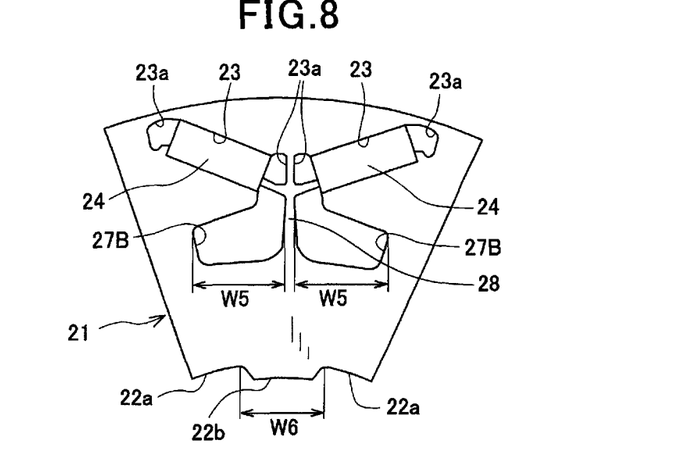
FIG. 8 is an axial view of a portion of the rotor according to the second embodiment, the portion corresponding to one of magnetic poles that are formed in the rotor.

FIGS. 6-8 show the structure of a rotor 20A according to the second embodiment.

The rotor 20A includes, as in the first embodiment, a hollow cylindrical rotor core 21, a plurality of permanent magnets 24, a resin filler 25 and a pair of end plates 26. The rotor core 21 has a center hole 22, in which the rotating shaft 13 is press-fitted, and a plurality of pairs of magnet-receiving holes 23 that are formed in the vicinity of a radially outer periphery of the rotor core 21 so as to be spaced from one another in the circumferential direction of the rotor core 21 at predetermined intervals. Each of the permanent magnets 24 is received in a corresponding one of the magnet-receiving holes 23 of the rotor core 21. The permanent magnets 24 together form a plurality (e.g., eight) of magnetic poles the polarities of which alternate between north and south in the circumferential direction of the rotor core 21. The resin filler 25 is filled in the magnet-receiving holes 23 of the rotor core 21 to fix the permanent magnets 24 in the magnet-receiving holes 23. The end plates 26 are respectively arranged on opposite axial sides of the rotor core 21 so as to sandwich the rotor core 21 therebetween.

Moreover, in a radially inner surface of the rotor core 21 which defines the center hole 22, there are formed a plurality of non-contacting recesses 22a and a plurality of contacting protrusions 22b. Each of the non-contacting recesses 22a extends in the axial direction of the rotor core 21 and is recessed radially outward no as not to be in contact with the rotating shaft 13. Each of the contacting protrusions 22b extends in the axial direction of the rotor core 21 and protrudes radially inward so as to be in pressed contact with the rotating shaft 13. The non-contacting recesses 22a are alternately arranged with the contacting protrusions 22b in the circumferential direction of the rotor core 21. Furthermore, each of the contacting protrusions 22b is circumferentially positioned so as to be in radial alignment with the center of a corresponding one of the magnetic poles formed by the permanent magnets 24 received in the pairs of the magnet-receiving holes 23 of the rotor core 21.

However, unlike in the first embodiment, there are no through-holes 27 formed in the rotor core 21. Instead, in the present embodiment, the rotor core 21 has a plurality of pairs of magnetic flux barriers (or voids) 27B. Each of the pairs of the magnetic flux barriers 27B is formed radially inside a corresponding one of the pairs of the magnet-receiving holes 23 of the rotor core 21 to block leakage of magnetic flux, which is created in the rotor core 21, radially inward.

More specifically, as shown in FIG. 8, each of the magnetic flux barriers 27B is formed on the magnetic pole center-side of a corresponding one of the magnet-receiving holes 23 so as to extend from a magnetic pole center-side end of the corresponding magnet-receiving hole 23 radially inward. Further, each of magnetic flux barriers 27B is located radially outside a corresponding one of the contacting protrusions 22b. In addition, each of the magnetic flux barriers 27B extends in the axial direction of the rotor core 21 so as to penetrate the rotor core 21 in the axial direction.

Moreover, in the present embodiment, for each pair of the magnet-receiving holes 23, there is formed a center bridge 28 that radially extends between the two magnet-receiving holes 23 of the pair. Further, the center bridge 28 extends radially inward so as to separate the corresponding two magnetic flux barriers 27B from each other. The center bridge 28 is provided for causing magnetic flux saturation and thereby impeding formation of a magnetic circuit between the two magnet-receiving holes 23 and between the corresponding two magnetic flux barriers 27B. In addition, the center bridge 28 is located at the circumferential center position of the corresponding contacting protrusion 22b.

In the present embodiment, the magnetic flux barriers 27B have a circumferential width W5 set to be greater than the circumferential width W6 of the contacting protrusions 22b.

Referring back to FIG. 6, in the present embodiment, each of the end plates 26 includes a first connecting passage 26b that fluidically connects the non-contacting recesses 22a to the magnetic flux barriers 27B formed in the rotor core 21. The first connecting passage 26b is formed, in an axially inner surface of the end plate 26 facing the rotor core 21, into an annular shape. Moreover, each of the end plates 26 also includes a plurality of cooling oil discharge holes 26a each of which is formed to axially face and thus fluidically communicate with a corresponding one of the magnetic flux barriers 27B formed in the rotor core 21.

Consequently, in operation, the cooling oil, which is supplied by the cooling oil supplier 60 to the non-contacting recesses 22a via the cooling oil passage 61 and the cooling oil introduction holes 13a formed in the rotating shaft 13, can be discharged to the internal space of the housing 10 via the cooling oil discharge holes 26a after flowing through the non-contacting recesses 22a, the first connecting passages 26b and the magnetic flux barriers 27B. As a result, by making the cooling oil further flow through the magnetic flux barriers 27B, it is possible to more effectively cool the rotor core 21.

With the above-described structure of the rotor 20A according to the present embodiment, during the process of press-fitting the rotating shaft 13 into the center hole 22 of the rotor core 21, the press-fit stress induced in the rotor core 21 is distributed only among the contacting protrusions 22b. Further, for each of the contacting protrusions 22b, the displacement of the contacting protrusion 22b caused by the press-fit stress can be absorbed by the corresponding pair of the magnetic flux barriers 27B located radially outside the contacting protrusion 22b. As a result, it is possible to prevent deformation of the rotor core 21 on the radially outer periphery thereof, thereby keeping the predetermined air gap between the rotor 20 and the stator 30 unchanged.

In particular, in the present embodiment, with the magnetic flux barriers 27B, it is possible to reduce d-axis inductance in the rotor core 21 and thereby increase reluctance torque while relaxing concentration of the press-fit stress in the rotor core 21.

Moreover, in the present embodiment, in each of the end plates 26, there is formed the first connecting passage 26b that fluidically connects the non-contacting recesses 22a to the magnetic flux barriers 27B. Consequently, with the first connecting passages 26b formed in the end plates 26, it becomes possible to make the cooling oil supplied to the non-contacting recesses 22a further flow through the magnetic flux barriers 27B, thereby more effectively cooling the rotor core 21.

Third Embodiment

Figure 9:
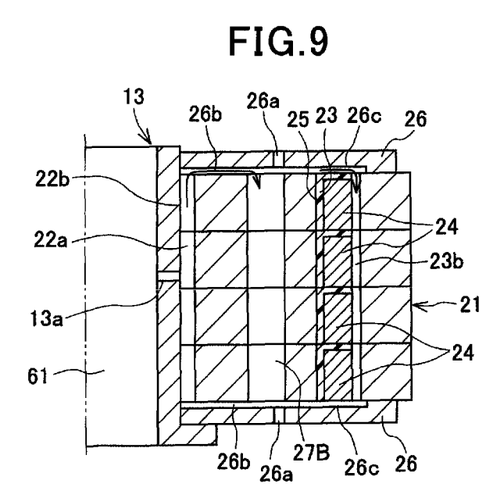
FIG. 9 is a schematic cross-sectional view of a rotor according to a third embodiment, the cross-sectional view being taken along an axial direction of the rotor.

This embodiment illustrates a rotor 20B which has almost the same structure as the rotor 20A according to the second embodiment; accordingly, only the differences therebetween will be described hereinafter.

In the second embodiment, the resin filler 25 is filled in each of the magnet-receiving holes 23 of the rotor core 21 without leaving any void space in the magnet-receiving hole 23 (see FIG. 6).

In comparison, in the present embodiment, as shown in FIG. 9, the resin filler 25 is filled in each of the magnet-receiving holes 23 of the rotor core 21, leaving a void space in the magnet-receiving hole 23. The void space extends over the entire axial length of the rotor core 21 so as to open on both axial end faces of the rotor core 21. The void space constitutes an internal cooling oil passage 23b of the rotor core 21.

Moreover, in the present embodiment, in each of the end plates 26, there is formed a second connecting passage 26c as well as the first connecting passage 26b previously described in the second embodiment. The second connecting passage 26c is located radially outside the first connecting passage 26b and fluidically connects the magnetic flux barriers (or through-holes) 27B to the internal cooling oil passages 23b formed in the magnet-receiving holes 23. More specifically, in the present embodiment, the first and second connecting passages 26b and 26c are integrally formed, in the axially inner surface of the end plate 26 facing the rotor core 21, into an annular shape. In other words, both the first and second connecting passages 26b and 26c are constituted by an annular groove formed in the axially inner surface of the end plate 26.

In operation, the cooling oil, which is supplied by the cooling oil supplier 60 to the non-contacting recesses 22a via the cooling oil passage 61 and the cooling oil introduction holes 13a formed in the rotating shaft 13, first flows through the non-contacting recesses 22a. Then, the cooling oil further flows through both first and second flow paths. The first flow path is constituted by the first connecting passages 26b formed in the end plates 26 and the magnetic flux barriers 27B formed in the rotor core 21. The second flow path is constituted by the second connecting passages 26e formed in the end plates 26 and the internal cooling oil passages 23b formed in the magnet-receiving holes 23 of the rotor core 21. Thereafter, the cooling oil is discharged to the internal space of the housing 10 via the cooling oil discharge holes 26a formed in the end plates 26.

The above-described rotor 20B according to the present embodiment has the same advantages as the rotor 20A according to the second embodiment.

Moreover, in the present embodiment, with the first and second connecting passages 26b and 26c formed in the end plates 26, it becomes possible to make the cooling oil flow through the internal cooling oil passages 23b as well as through the magnetic flux barriers 27B, thereby more effectively cooling the rotor core 21.

Fourth Embodiment

This embodiment illustrates a rotating electric machine 2 which has almost the same configuration as the rotating electric machine 1 according to the first embodiment; accordingly, only the differences therebetween will be described hereinafter.

In the first embodiment, the rotating electric machine 1 includes the cooling oil supplier 60 for supplying the cooling oil to the non-contacting recesses 22a formed in the rotor core 21 and thereby cooling the rotor core 21, but no means for cooling the stator 30 (see FIGS. 1-2).

Figure 10:
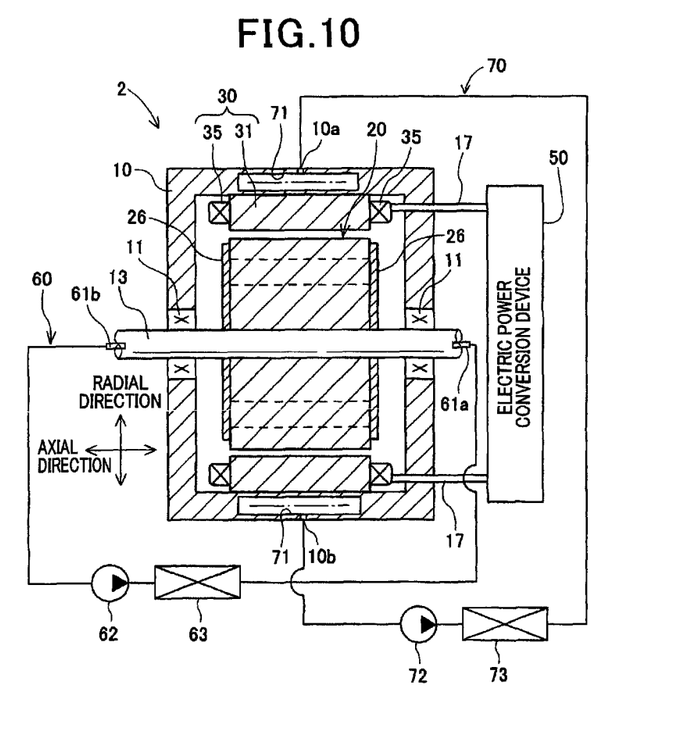
FIG. 10 is a schematic cross-sectional view of a rotating electric machine according to a fourth embodiment.
Figure 11:
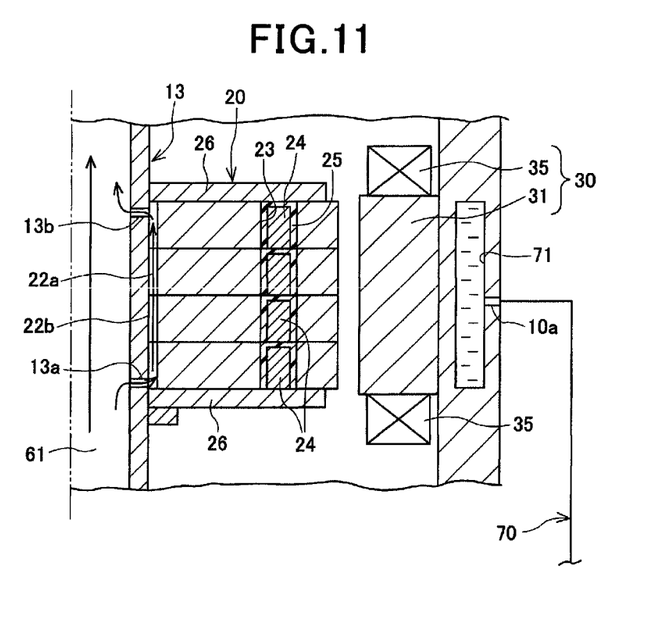
FIG. 11 is an enlarged cross section view of part of the rotating electric machine according to the fourth embodiment.

In comparison, in the present embodiment, as shown in FIGS. 10-11, the rotating electric machine 2 further includes, in addition to the cooling oil suppler 60, a cooling water supplier 70 for supplying cool water to a cooling water passage 71 formed in the housing 10 and thereby cooling the stator 30.

Specifically, in the present embodiment, the cooling oil passage 61 formed in the rotating shaft 13 has an inlet 61a formed at one axial end (i.e., the right end in FIG. 10) and an outlet 61b formed at the other axial end (i.e., the left end in FIG. 10). Moreover, on the upstream side (i.e., the lower side in FIG. 11) of the cooling oil passage 61, there are formed a plurality of cooling oil introduction holes 13a in the rotating shaft 13 in a radial pattern. Each of the cooling oil introduction holes 13a fluidically connects the cooling oil passage 61 to a first axial end (i.e., the lower end in FIG. 11) of a corresponding one of the non-contacting recesses 22a. On the downstream side (i.e., the upper side in FIG. 11) of the cooling oil passage 61, there are formed a plurality of cooling oil discharge holes 13b in the rotating shaft 13 in a radial pattern. Each of the cooling oil discharge holes 13b fluidically connects a second axial end (i.e., the upper end in FIG. 11) of a corresponding one of the non-contacting recesses 22a to the cooling oil passage 61.

As shown in FIG. 10, the cooling oil supplier 60 includes the cooling oil pump 62 and the heat dissipater 63. The cooling oil pump 62 delivers the cooling oil to the inlet 61a of the cooling oil passage 61 formed in the rotating shaft 13. The heat dissipater 63 dissipates the heat of the cooling oil which has returned to the cooling oil pump 62 from the outlet 61b of the cooling oil passage 61 after flowing through the cooling oil passage 61 and the non-contacting recesses 22a. The cooling oil passage 61, the cooling oil pump 62 and the heat dissipater 63 are fluidically connected with one another via cooling oil pipes, thereby forming a cooling oil circulation circuit.

More specifically, in the present embodiment, the cooling oil discharged from the cooling oil pump 62 is delivered, via the heat dissipater 63, to the inlet 61a of the cooling oil passage 61 formed in the rotating shaft 13. Then, the cooling oil is introduced from the cooling oil passage 61 to the first axial ends of the non-contacting recesses 22a formed in the rotor core 21 via the corresponding cooling oil introduction holes 13a formed in the rotating shaft 13. The introduced cooling oil then flows through the non-contacting recesses 22a from the first axial ends to the second axial ends of the non-contacting recesses 22a while cooling the rotor core 21. Thereafter, the cooling oil is discharged from the second axial ends of the non-contacting recesses 22a via the corresponding cooling oil discharge holes 13b, returning to the cooling oil passage 61. Further, the cooling oil flows out of the cooling oil passage 61 via the outlet 61b, returning to the cooling oil pump 62. Then, the cooling oil is again discharged from the cooling oil pump 62 to circulate through the cooling oil circulation circuit.

In addition, in the present embodiment, there are no cooling oil discharge holes 26a formed in the end plates 26 as described in the first embodiment. Accordingly, in the present embodiment, the cooling oil is prevented from entering the internal space of the housing 10.

The cooling water supplier 70 includes a cooling water passage 71, a cooling water pump 72 and a heat dissipater 73. The cooling water passage 71 is formed in the axially-central portion of the circumferential wall of the housing 10 so as to extend in the circumferential direction by one complete turn. The cooling water pump 72 delivers the cooling water to the cooling water passage 71 via a cooling water inlet 10a. The cooling water inlet 10a is formed in a top part of the axially-central portion of the circumferential wall of the housing 10 so as to fluidically communicate with the cooling water passage 71. The heat dissipater 73 dissipates the heat of the cooling water flowing out of the cooling water passage 71 via a cooling water outlet 10b. The cooling water outlet 10b is formed in a bottom part of the axially-central portion of the circumferential wall of the housing 10 so as to fluidically communicate with the cooling water passage 71. In addition, as described previously in the first embodiment, the radially outer surface of the stator core 31 is fixedly fitted to the inner surface of the axially-central portion of the circumferential wall of the housing 10. That is, the cooling water passage 71 is formed radially outside the stator 30 so as to surround the stator 30. The cooling water passage 71, the cooling water pump 72 and the heat dissipater 73 are fluidically connected with one another via cooling water pipes, thereby forming a cooling water circulation circuit.

More specifically, in the present embodiment, the cooling water discharged from the cooling water pump 72 is delivered, via the heat dissipater 73, to the cooling water inlet 10a, entering the cooling water passage 71. Then, the cooling water flows through the cooling water passage 71 while cooling the housing 10 and thus the stator core 31 abutting the housing 10. Thereafter, the cooling water flows out of the cooling water passage 71 via the cooling water outlet 10b, returning to the cooling water pump 72. Then, the cooling water is again discharged from the cooling water pump 72 to circulate through the cooling water circulation circuit.

The above-described rotating electric machine 2 according to the present embodiment has the same advantages as the rotating electric machine 1 according to the first embodiment.

Moreover, in the present embodiment, the rotating electric machine 2 includes both the cooling oil supplier 60 for cooling the rotor 20 and the cooling water supplier 70 for cooling the stator 30. Therefore, it is possible to effectively cool both the rotor 20 and the stator 30 during operation of the rotating electric machine 2.

In particular, in a rotating electric machine equipped with a water cooling system for cooling the stator, such as the rotating electric machine 2 according to the present embodiment, it is generally difficult to cool the rotor. However, according to the present embodiment, it is still possible to effectively cool the rotor 20 by supplying the cooling oil to the non-contacting recesses 22a formed in the rotor core 21.

While the above particular embodiments have been shown and described, it will be understood by those skilled in the art that various modifications, changes, and improvements may be made without departing from the spirit of the invention.

For example, in the fourth embodiment, the cooling oil supplier 60 is configured to supply the cooling oil only to the non-contacting recesses 22a formed in the rotor core 21. However, the cooling oil supplier 60 in the fourth embodiment may be modified to supply the cooling oil to the non-contacting recesses 22a and the magnetic flux barriers 27B formed in the rotor core 21 as in the second embodiment or to the non-contacting recesses 22a, the magnetic flux barriers 27B and the internal cooling oil passages 23b formed in the magnet-receiving holes 23 as in the third embodiment.

In the first embodiment, the rotating electric machine 1 is configured as a motor-generator that can selectively function either as an electric motor or as an electric generator. However, the present invention can also be applied to other rotating electric machines, such as an electric motor or an electric generator.

What is claimed is:
1. A rotating electric machine comprising:
a rotor for a rotating electric machine, the rotor comprising
a hollow cylindrical rotor core having a center hole, in which a rotating shaft of the rotating electric machine is to be press-fitted, and a plurality of magnet-receiving holes arranged in a circumferential direction of the rotor core; and
a plurality of permanent magnets each of which is received in a corresponding one of the magnet-receiving holes of the rotor core,
wherein
in a radially inner surface of the rotor core which defines the center hole, there are formed a plurality of non-contacting recesses and a plurality of contacting protrusions, each of the non-contacting recesses extending in an axial direction of the rotor core and being recessed radially outward so as not to be in contact with the rotating shaft, each of the contacting protrusions extending in the axial direction of the rotor core and protruding radially inward so as to be in pressed contact with the rotating shaft, the non-contacting recesses being alternately arranged with the contacting protrusions in the circumferential direction of the rotor core,
the rotor core further has a plurality of through-holes each of which penetrates the rotor core in the axial direction and is located radially outside and in radial alignment with a corresponding one of the contacting protrusions, each of the through-holes has no solid member provided therein;
the rotating electric machine further comprises:
a stator disposed in radial opposition to the rotor;
a cooling oil passage formed in the rotating shaft; and
a cooling oil supplier configured to supply cooling oil to the non-contacting recesses formed in the rotor core via the cooling oil passage.

2. The rotating electric machine as set forth in claim 1, wherein the rotor further comprises a pair of end plates that are respectively arranged on opposite axial sides of the rotor core so as to sandwich the rotor core therebetween, and
in each of the end plates, there is formed a first connecting passage that fluidically connects the non-contacting recesses to the through-holes formed in the rotor core.

3. The rotating electric machine as set forth in claim 2, wherein in each of the end plates, there is also formed a second connecting passage that fluidically connects the through-holes to the magnet-receiving holes of the rotor core.

4. The rotating electric machine as set forth in claim 1, wherein the rotor further comprises a pair of end plates that are respectively arranged on opposite axial sides of the rotor core so as to sandwich the rotor core therebetween, and
in each of the end plates, there are formed a plurality of cooling oil discharge holes, each of the cooling oil discharge holes fluidically communicating with a corresponding one of the non-contacting recesses formed in the rotor core, thereby allowing the cooling oil supplied to the corresponding non-contacting recess to be discharged axially outward via the cooling oil discharge hole.

5. The rotating electric machine as set forth in claim 1, further comprising:
a housing that receives both the rotor and the stator therein so that the stator abuts a wall of the housing;
a cooling water passage formed in the wall of the housing; and
a cooling water supplier configured to supply cooling water to the cooling water passage and thereby cool the stator,
wherein
the rotor further comprises a pair of end plates that are respectively arranged on opposite axial sides of the rotor core to block leakage of the cooling oil from non-contacting recesses axially outward.

6. The rotating electric machine as set forth in claim 1, wherein each of the through-holes is located so that both the through-hole and the corresponding contacting protrusion are circumferentially bisected by a same imaginary line that extends in a radial direction of the rotor core.

7. The rotating electric machine as set forth in claim 1, wherein the through-holes have a greater circumferential width than the contacting protrusions.

8. The rotating electric machine as set forth in claim 1, wherein each of the through-holes is configured as a magnetic flux barrier that is formed radially inside a corresponding one of the permanent magnets to block leakage of magnetic flux radially inward.

9. A rotating electric machine comprising:
a rotor shaft;
a rotor;
a stator disposed in radial opposition to the rotor;
a cooling oil passage formed in the rotating shaft; and
a cooling oil supplier configured to supply cooling oil to the non-contacting recesses formed in the rotor core via the cooling oil passage; wherein:
the rotor comprises:
a hollow cylindrical rotor core having a center hole, in which the rotating shaft of the rotating electric machine is to be press-fitted, and a plurality of magnet-receiving holes arranged in a circumferential direction of the rotor core; and
a plurality of permanent magnets each of which is received in a corresponding one of the magnet-receiving holes of the rotor core,
in a radially inner surface of the rotor core which defines the center hole, there are formed a plurality of non-contacting recesses and a plurality of contacting protrusions, each of the non-contacting recesses extending in an axial direction of the rotor core and being recessed radially outward so as not to be in contact with the rotating shaft, each of the contacting protrusions extending in the axial direction of the rotor core and protruding radially inward so as to be in pressed contact with the rotating shaft, the non-contacting recesses being alternately arranged with the contacting protrusions in the circumferential direction of the rotor core, and
the rotor core further has a plurality of through-holes each of which penetrates the rotor core in the axial direction and is located radially outside a corresponding one of the contacting protrusions,
the rotating electric machine further comprises:
a housing that receives both the rotor and the stator therein so that the stator abuts a wall of the housing;
a cooling water passage formed in the wall of the housing; and
a cooling water supplier configured to supply cooling water to the cooling water passage and thereby cool the stator, and
the rotor further comprises a pair of end plates that are respectively arranged on opposite axial sides of the rotor core to block leakage of the cooling oil from the non-contacting recesses axially outward.

10. A rotor for a rotating electric machine, the rotor comprising:
a hollow cylindrical rotor core having a center hole, in which a rotating shaft of the rotating electric machine is to be press-fitted, and a plurality of magnet-receiving holes arranged in a circumferential direction of the rotor core; and
a plurality of permanent magnets each of which is received in a corresponding one of the magnet-receiving holes of the rotor core,
wherein
in a radially inner surface of the rotor core which defines the center hole, there are formed a plurality of non-contacting recesses and a plurality of contacting protrusions, each of the non-contacting recesses extending in an axial direction of the rotor core and being recessed radially outward so as not to be in contact with the rotating shaft, each of the contacting protrusions extending in the axial direction of the rotor core and protruding radially inward so as to be in pressed contact with the rotating shaft, the non-contacting recesses being alternately arranged with the contacting protrusions in the circumferential direction of the rotor core,
the rotor core further has a plurality of through-holes each of which penetrates the rotor core in the axial direction and is located radially outside and in radial alignment with a corresponding one of the contacting protrusions,
each of the through-holes has no solid member provided therein, and
the circumferential width of each of the non-contacting recesses is greater than the circumferential width of each of the contacting protrusions.

11. The rotor as set forth in claim 10, wherein each of the through-holes is located so that both the through-hole and the corresponding contacting protrusion are circumferentially bisected by a same imaginary line that extends in a radial direction of the rotor core.

12. The rotor as set forth in claim 10, wherein the through-holes have a greater circumferential width than the contacting protrusions.

13. The rotor as set forth in claim 10, wherein each of the through-holes is configured as a magnetic flux barrier that is formed radially inside a corresponding one of the permanent magnets to block leakage of magnetic flux radially inward.

* * * * *